(12) United States Patent
Fujiki et al.

(10) Patent No.: US 6,880,663 B2
(45) Date of Patent: Apr. 19, 2005

(54) VEHICLE FRONT STRUCTURE (75) Inventors: Hiroyuki Fujiki, Kanagawa (JP); Koichi Sagawa, Kanagawa (JP); Kazuhito Tanabe, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 106 days.

(21) Appl. No.: 10/295,904

(22) Filed: Nov. 18, 2002

(65) Prior Publication Data
US 2003/0094803 A1 May 22, 2003

(30) Foreign Application Priority Data

| Nov. 19, 2001 | (JP) | 2001-353713 |
|---|---|---|
| Mar. 5, 2002 | (JP) | 2002-058638 |
| Sep. 6, 2002 | (JP) | 2002-260934 |

(51) Int. Cl.[7] .............................. B62D 21/15; B60K 5/12
(52) U.S. Cl. .................. 180/232; 180/312; 280/784; 296/187.09
(58) Field of Search .................. 280/784; 180/232, 180/312, 299; 296/187.09, 193.09; 188/371

(56) References Cited

U.S. PATENT DOCUMENTS

| 3,815,703 | A | * | 6/1974 | De Lorean et al. ......... 180/232 |
|---|---|---|---|---|
| 5,110,177 | A | * | 5/1992 | Akio ..................... 296/187.11 |
| 5,348,114 | A | * | 9/1994 | Yamauchi ................... 180/291 |
| 5,372,216 | A | * | 12/1994 | Tsuji et al. ................ 180/274 |
| 5,431,445 | A | * | 7/1995 | Wheatley ................... 280/784 |
| 5,772,245 | A | * | 6/1998 | Muhlhausen ............... 280/784 |
| 6,203,098 | B1 | | 3/2001 | Motozawa et al. |
| 6,736,448 | B1 | * | 5/2004 | Hanakawa et al. .... 296/187.09 |
| 2003/0011184 | A1 | * | 1/2003 | Sonomura et al. .......... 280/784 |
| 2003/0209380 | A1 | * | 11/2003 | Anzai et al. ................ 180/312 |

FOREIGN PATENT DOCUMENTS

| GB | 2299308 A | | 10/1996 |
|---|---|---|---|
| JP | 8-85473 | * | 4/1996 |
| JP | 8-324454 | * | 12/1996 |
| JP | 10-338164 A | | 12/1998 |
| JP | 2000-53019 A | | 2/2000 |
| JP | 2001-158377 A | | 6/2001 |

* cited by examiner

*Primary Examiner*—Paul N. Dickson
*Assistant Examiner*—George D. Spisich
(74) *Attorney, Agent, or Firm*—Foley & Lardner LLP (57) ABSTRACT

A vehicle front structure includes a side member to be placed to extend in the longitudinal direction of a vehicle. The side member includes a support portion to support a power unit at a support point, and a weak section which is formed on the front side of the support point toward the front of the vehicle, and which is weakened in an upper side and lateral sides of the side member with respect to a lower side of the side member.

8 Claims, 8 Drawing Sheets

VEHICLE FRONT STRUCTURE

BACKGROUND OF THE INVENTION

The present invention relates to vehicle structure including side members for supporting a vehicle power unit such as a unit composed of engine and transmission.

Published Japanese Patent Application Kokai No. 2000-53019 shows a vehicle front body structure including a stress concentration portion to control a deformation mode in case of frontal collision of a vehicle. A side member of this document include a rear section and a front section which is formed with a bead, or a notch or a stress concentration portion of other type for starting plastic deformation with a low yield point stress as compared to the rear section.

SUMMARY OF THE INVENTION

However, the vehicle front body structure of the above-mentioned document is arranged to control the deformation mode so that compression proceeds from the front section to the rear section in a frontal collision. Accordingly, the power unit including engine could shift rearwards toward the passenger compartment.

It is an object of the present invention to provide a vehicle front structure to prevent rearward movement of a power unit in case of collision.

According to the present invention, a vehicle front structure comprises: at least one side member to be placed to extend in a longitudinal direction of a vehicle. The side member includes a support portion to support a power unit at a support point, and a weak section which is formed on a front side of the support point, and which is weakened in an upper side and lateral sides of the side member with respect to a lower side of the side member.

According to another aspect of the present invention, a side member for extending in a longitudinal direction of a vehicle and for supporting a power unit of the vehicle, comprises: means for supporting the power unit of a vehicle at a support point between front and rear ends of the side member; and means for controlling a bending deformation of the side member in case of an impact force being applied from the front end of the side member in the longitudinal direction in a collision of the vehicle so that the support point is moved downward by the bending deformation of the side member.

The other objects and features of this invention will become understood from the following description with reference to the accompanying drawings.

DETAILED DESCRIPTION OF THE INVENTION

Figure 1:
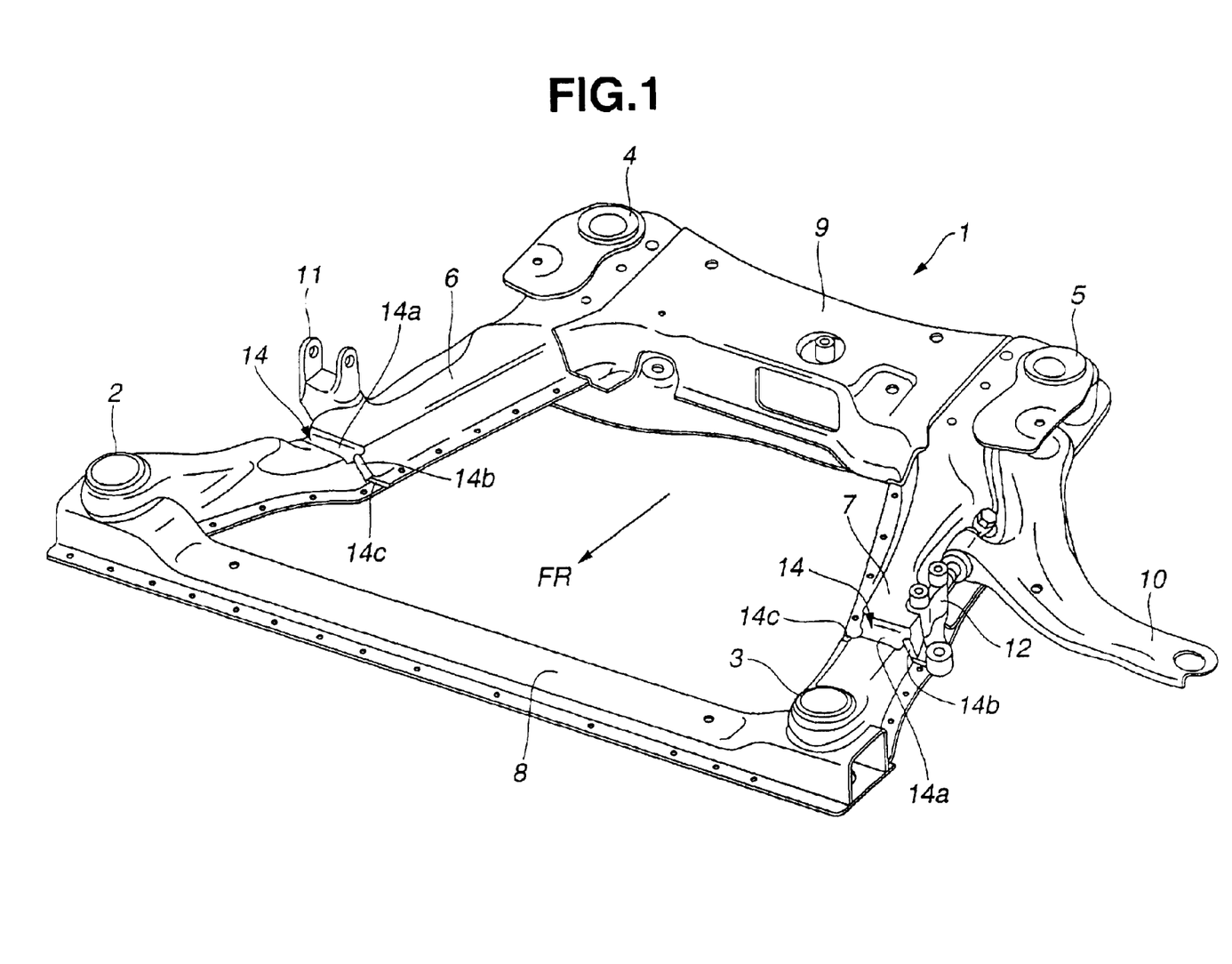
FIG. 1 is a perspective view showing a vehicle front structure according to a first embodiment of the present invention.

FIG. 1 shows a vehicle front body structure according to a first embodiment of the present invention. A vehicle front body structure 1 shown in FIG. 1 is in the form of a subframe which is an approximately rectangular frame having four corners. In the four corners, there are provided, respectively, front right and left collars 2 and 3, and rear right and left collars 4 and 5 for connection with a vehicle body. A right side member 6 extends rearwards from a front end provided with front right collar 2, to a rear end provided with rear right collar 4, and a left side member 7 extends from a front end provided with front left collar 3 to a rear end provided with rear left collar 5. A front cross member 8 extends from front right collar 2 to front left collar 3, and a rear cross member 9 extends from rear right collar 4 to rear left collar 5.

Left side member 7 supports a left suspension link 10 swingably through two link bushes. Similarly, right side member 6 supports a right suspension link (not shown) through two link bushes.

Right and left engine mount support portions 11 and 12 are provided, respectively, in right and left side members 6 and 7 for installation of engine mounts.

Right and left bead sections (or weak sections) 14 are provided, respectively, in right and left side members 6 and 7. On each of the right and left sides, the bead section 14 is located near an engine mount point EM (a power unit support point) defined by engine mount support portion 11 or 12 of the side member 6 or 7, on the front side of the engine mount point EM. In the assembled state of the vehicle, right side member 6 extends from the rear end to the front end in the forward direction toward the front of the vehicle, and the bead section 14 of right side member 6 is located between the front end of right side member 6 and the engine mount point EM of right side member 6. Similarly, the bead section 14 of left side member 7 is located between the front end of left side member 7 and the engine mount point EM of left side member 7. The position of bead section 14 in each side member is closer to the engine mount point EM, than to the front end of the side member.

Figure 2:
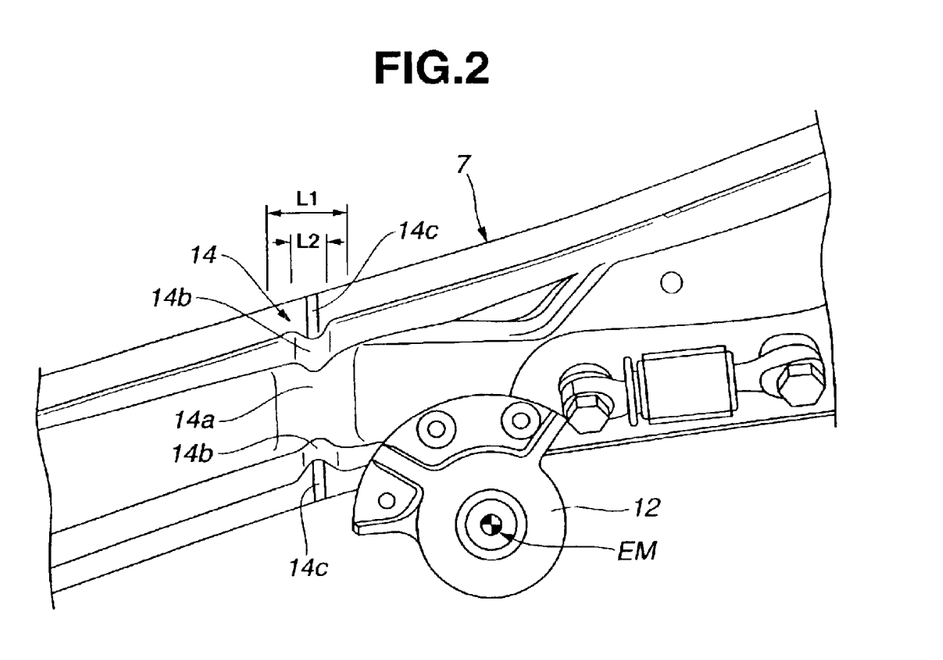
FIG. 2 is a plan view showing a left side member of the structure shown in FIG. 1.
Figures 3A, 3B:
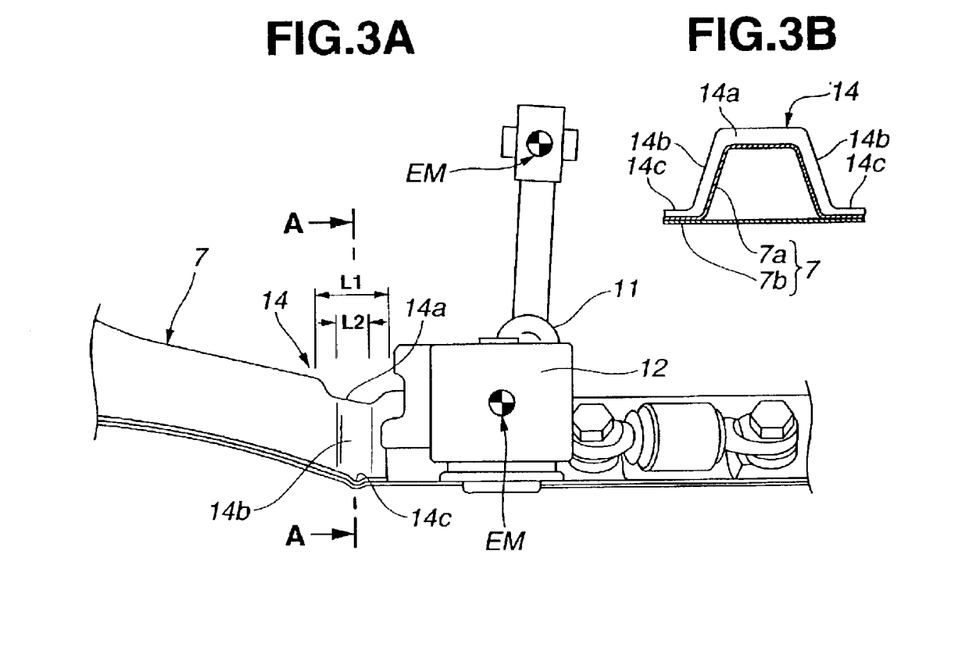
FIG. 3A is a side view showing a bead section of the left side member of FIG. 2.
FIG. 3B is a sectional view taken across a line A—A in FIG. 3A.

FIGS. 2 and 3 (3A and 3B) show bead section 14 of left side member 7. Bead section 14 includes a first (upper) bead portion 14a formed in the upper side of side member 7, and second (lateral) bead portions 14b formed in side walls of side member 7. First bead portion 14a extends from an inboard end to an outboard end in the lateral (widthwise) direction of side member 7 or in the lateral direction of the vehicle, second bead portion 14b on the inboard side extends downwards continuously from the inboard end of first bead portion 14a, and second bead portion 14b on the outboard side extends downwards continuously from the outboard end of first bead portion 14a. In this example, first and second bead portions 14a and 14b form a groove extending continuously in the form of an inverted U.

The lower side of left side member 7 is formed with a bent portion 14c projecting downwards. Bent portion 14c extends in the lateral direction of the vehicle just below the first and second bead portions 14a and 14b of left side member 7. In this example, second bead portions 14b extend downwards up to bent portion 14c. In this example, each of bead portions 14a and 14b is a panel portion depressed inwards. Bent portion 14c serving as a lower portion of weak section 14 is a panel portion bulged outwards.

In the example shown in FIGS. 2 and 3, the width L1 of first bead portion 14a as measured in the longitudinal direction of side member 7 or in the longitudinal direction of the vehicle is greater than the width L2 of second bead portions 14b as measure in the longitudinal direction of side member 7 or in the vehicle longitudinal direction.

Bead section 14 of right side member 6 is constructed in the same manner as bead portion 14 of left side member 7, as shown in FIG. 1.

Figure 4:
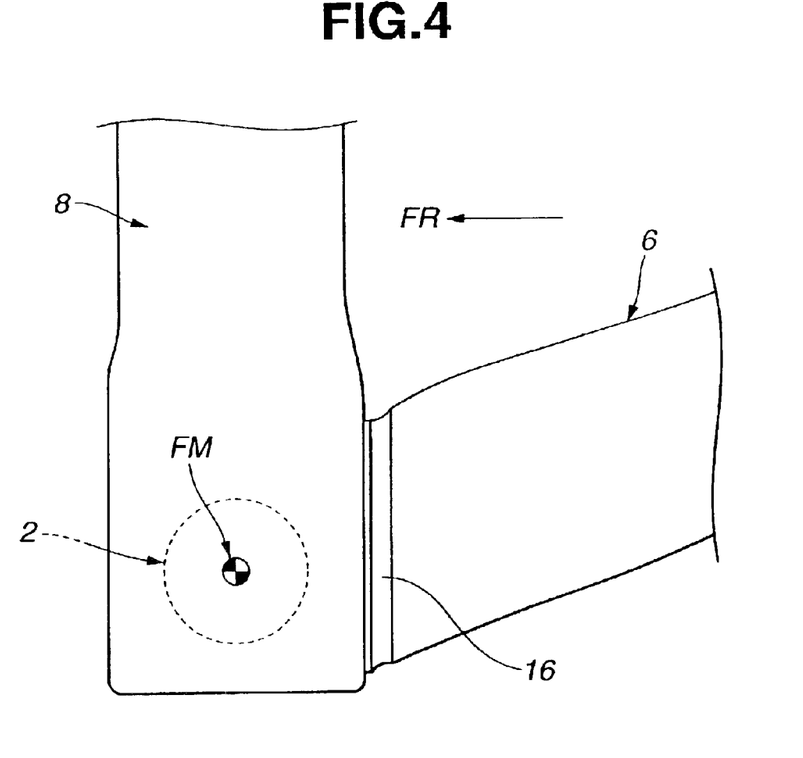
FIG. 4 is a view showing the under side of the front portion of the right side member in the structure of FIG. 1.
Figure 5:
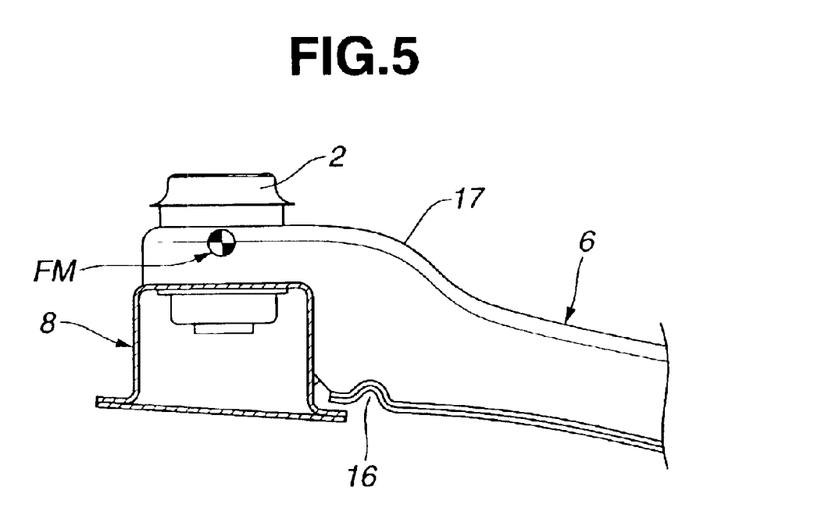
FIG. 5 is a side view showing the front portion of the right side member shown in FIG. 4.

FIGS. 4 and 5 show a third bead portion 16 of right side member 6. Third bead portion 15 is formed in the lower side of right side member 6 at a position immediately behind a vehicle body installing point FM defined by front right collar 2. Third bead portion 15 extends in the vehicle lateral direction in the under side of side member 6. A bent portion 17 projecting upwards is formed in the upper side of side member 6, at a position just above third bead portion 16. Third bead portion 15 is a panel portion depressed inwards.

Left side member 7 is formed with third bead portion 16 and bent portion 17 in the same manner, at the position immediately behind the front left vehicle body installing point FM defined front left collar 3.

The thus-constructed front vehicle body structure functions in the following manner. In case of a collision, first and second bead portions 14a and 14b collapse together in an early stage. In this case, first bead portion 14a having the larger width L1 is compressed largely, by the energy of collision, in the vehicle longitudinal direction as compared to second bead portions 14b. Therefore, each of side members 6 and 7 is bent to a V-shaped form having a front section of the side member sloping down to the position of bead section 14 and a rear section sloping down to the position of bead section 14. Bead section 14 having first and second bead portions 14a and 14b so designed that L1>L2 is effective in bending each side member 6 or 7 downward at the position of bead section 14 securely into the desirable V-shaped form at the early stage of the collision. In this state, the front section of each side member 6 or 7 acts to apply impact energy to push the rear section of the side member in an oblique direction intermediate between the downward direction and the rearward direction toward the rear of the vehicle.

Bent portion 14c formed in the lower side of each side member 6 or 7 functions to define the apex of the V-shaped bent form and promotes the bending deformation of the side member 6 or 7 into the V-shaped form.

Moreover, the front portion of each side member 6 or 7 formed with third bead portion 16 on the lower side and bent portion 17 on the upper side is effective in bending downward the front section of the side member between third bead portion 16 and the bead section 14. Thus, the front portion of each side member 6 or 7 promotes the bending deformation of the side member 6 or 7 to the V-shaped form.

Figure 6:
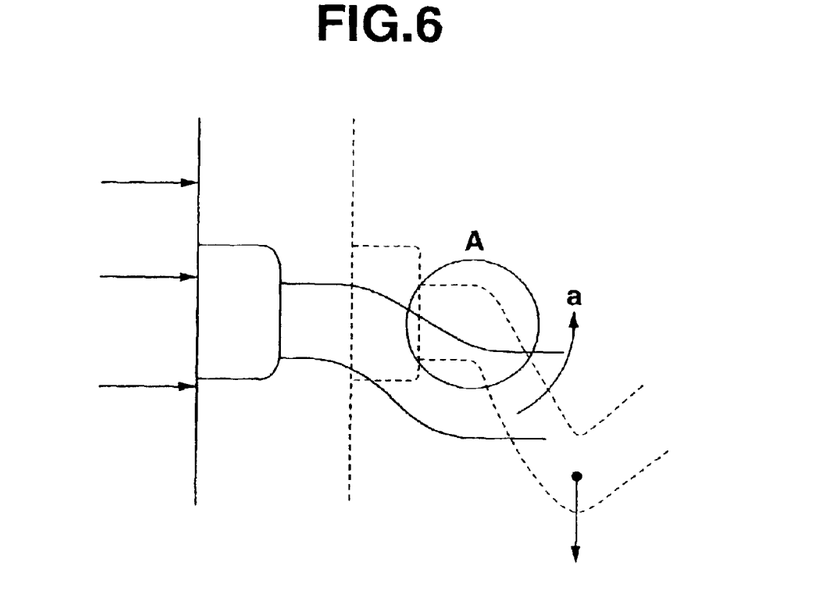
FIGS. 6 and 7 are views for illustrating deformation mode in a frontal collision, of side member formed with a third bead portion and bent portion according the first embodiment in comparison with deformation mode of side member having no bead portion and no bent portion.
Figure 7:
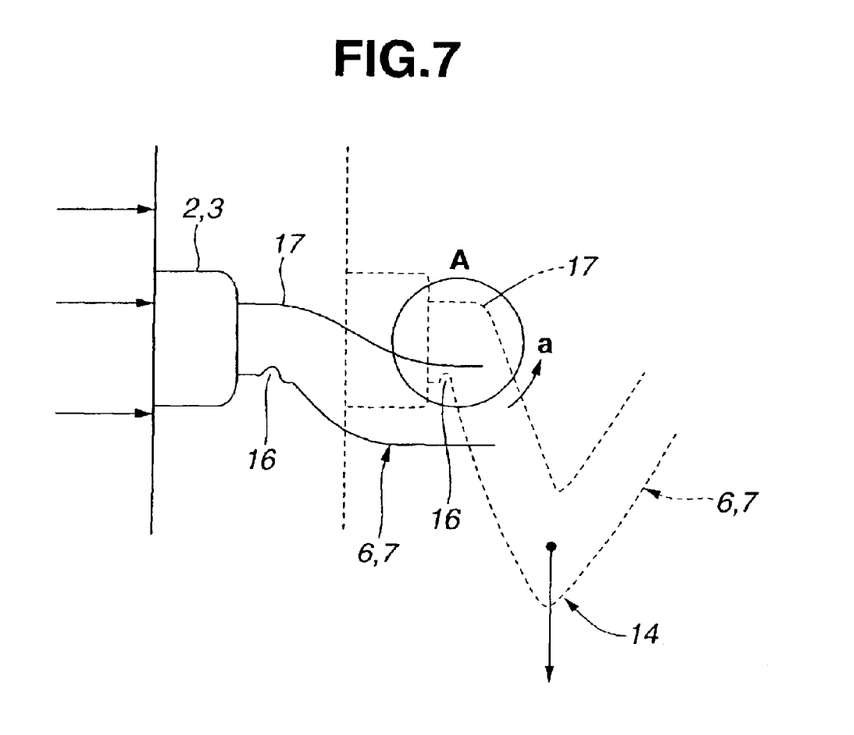
Figure 8:
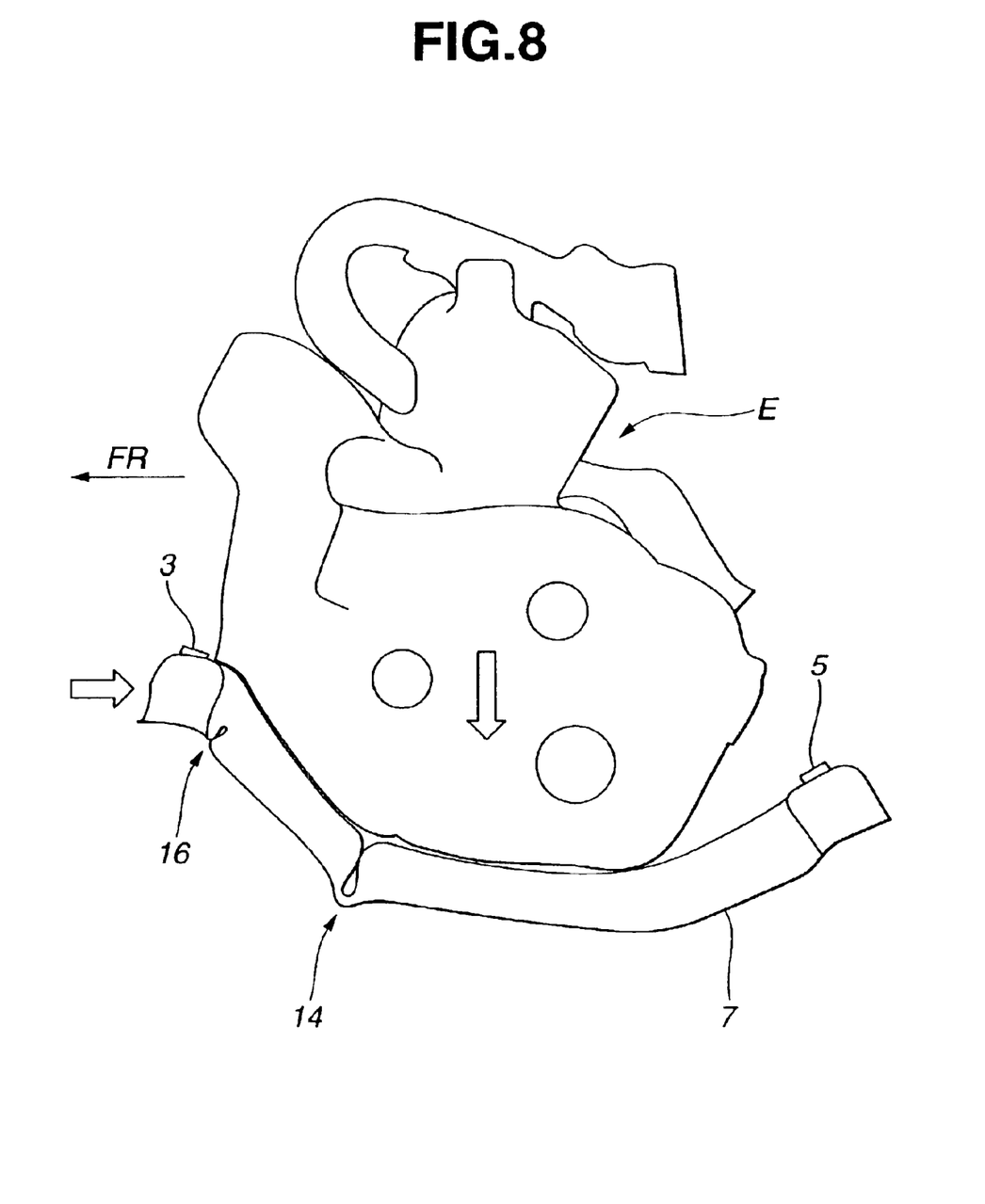
FIG. 8 is a view showing the deformation mode of the vehicle front structure according to the first embodiment in a frontal collision.

If the front end portion ("A") of each side member 6 or 7 is rigid in the bending direction, the front portion ("A") tends to increase a force "a" restraining the downward bending deformation of the side member, as shown in FIG. 6. Accordingly, the front portion of each side member 6 or 7 is designed to reduce the rigidity in the bending direction with third bead portion 16 and bent portion 17. Therefore, the front end portion of each side member 6 or 7 can function to decrease the force "a" restraining the downward bending deformation of the side member.

Therefore, in the middle and later stages of the collision, this front vehicle body structure can promote the downward bending deformation of each side member 6 or 7, and shift the engine (or power unit) E downwards in a reliable manner.

In this way, side members 6 and 7 according to the first embodiment are bent in the following mode. First, bead sections 14 formed in side members 6 and 7 near engine mount installing points EM make it possible to control the positions of the deformed portions of side members 6 and 7 near the engine mount installing points EM. Bead sections 14 having larger bead portion 14a and smaller bead portions 14b promotes earlier V-shaped deformation of each side member. Bent portions 14c further promote the V-shaped bending deformation of each side member by defining the apexes of the V-shaped deformation. The front end portion of each side member 6 or 7 further promotes the downward bending deformation of the side member with third bead portion 16 on the lower side and the upward bent portion 17. With these functions, the structure according to the first embodiment can ensure a downward movement of engine E in case of frontal collision of the vehicle.

The first embodiment can provide the following effects. Bead sections 14 formed in front of the position of the engine mounts can prevent movement of engine E in the rearward direction securely. Bead section 14 having the upper wider bead portion 14a and narrower lateral side bead portions 14b in each side member ensures the early V-shaped deformation of each side member at the early stage of a collision. Bead section 14 formed near the engine mount point on the front side in each side member can move the position of the engine mount downwards and hence move engine E downward securely. Bent portion 14c on the lower side promotes the downward bending of the side member and acts to prevent downward movement of the rear section of the side member and promote downward movement of engine E. Third bead portion 16 on each side promotes downward bending of the front section of the side member and thereby promote the V-shaped bending deformation of the side member. Bent portion 17 formed above third bead portion 16 further promotes downward bending of the front section of the side member and thereby secure downward movement of engine E.

Figure 9:
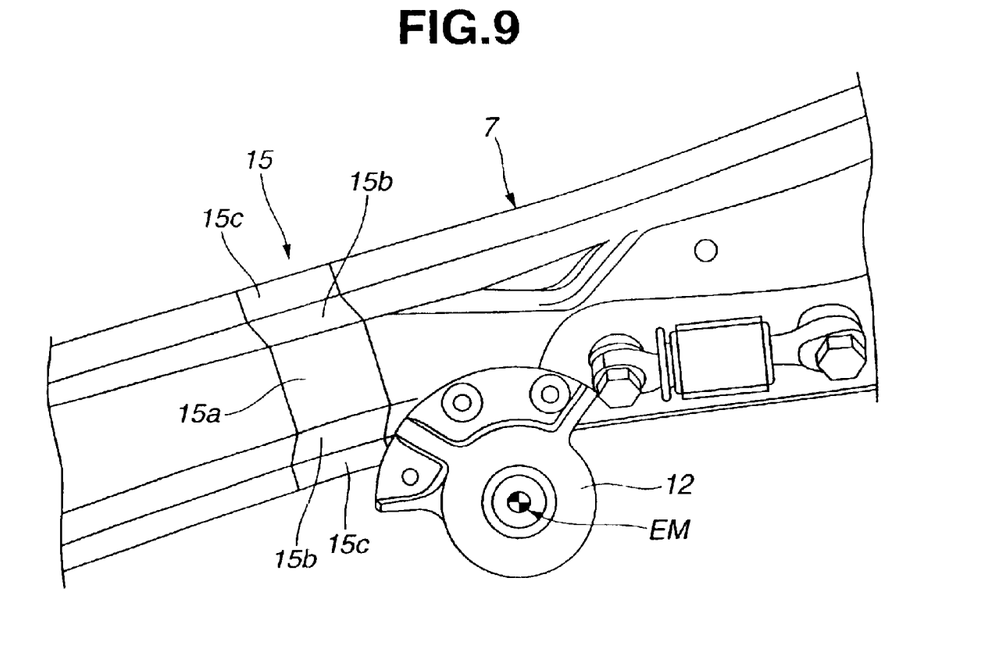
FIG. 9 is a plan view showing a low strength section in a left side member in a vehicle front structure according to a second embodiment of the present invention.
Figure 10:
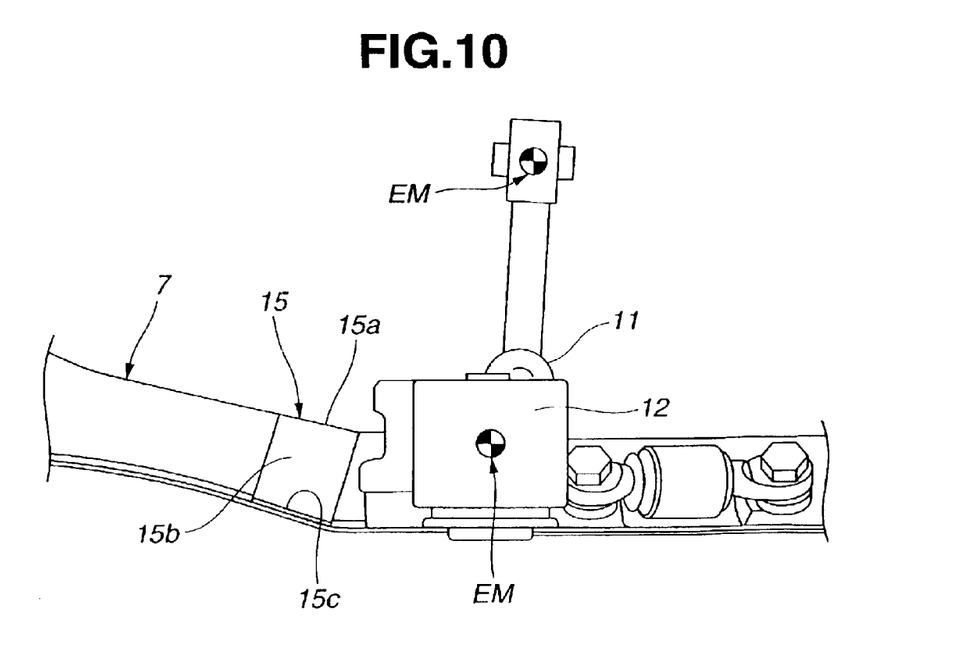
FIG. 10 is a side view showing the low strength section of the left side member shown in FIG. 9.

FIGS. 9 and 10 shows a vehicle front body structure according to a second embodiment of the present invention. Each of left and right side members 6 and 7 includes a low strength section (or weak section) 15 instead of bead section 14 of the first embodiment. On each of the right and left sides, the low strength section 15 is located near engine mount point EM (power unit support point) of side member 6 or 7, on the front side of the engine mount point EM. Low strength section 15 of each side member 6 or 7 is a section in which the upper side and left and right lateral sides are weakened as compared to the lower side.

Low strength section 15 in each side member of this example is a section of the side member 6 or 7 in which the wall thickness is reduced in the upper and lateral sides as compared to the surrounding portion.

Low strength section 15 in each side member 6 or 7 of this example includes a first (upper) low strength portion 15a formed in the upper side of the side member, and second (lateral) low strength portions 15b formed in side walls of the side member. First low strength portion 15a extends from an inboard end to an outboard end in the lateral direction of the vehicle or in the widthwise or lateral direction of the side member, second low strength portion 15b on the inboard side extends downwards continuously from the inboard end of first low strength portion 15a, and second low strength portion 15b on the outboard side extends downwards continuously from the outboard end of first low strength portion 15a.

The lower side of the side member is formed with lower panel joint portions 15c. Lower panel joint portion 15c on the inboard side extends in the lateral direction from the lower end of second low strength portion 15b on the inboard side. Lower panel joint portion 15c on the outboard side extends in the lateral direction from the lower end of second low strength portion 15b on the outboard side. Lower panel joint portions 15c form a lower portion of the low strength section 15.

Figure 11A:
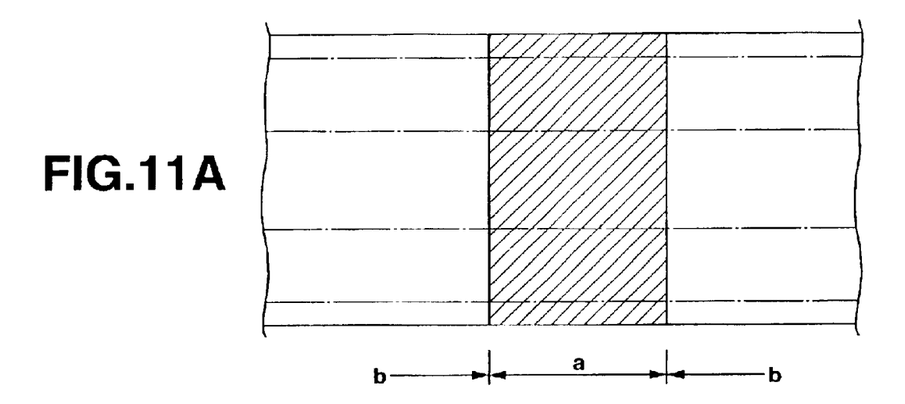
FIGS. 11A, 11B and 11C are views illustrating a tailored blank method for producing side members according to the second embodiment.

FIGS. 11A, 11B and 11C show a process of producing side member 7. FIG. 11A shows a flat plate or plate in a blank state before press forming. The plate shown in FIG. 11 includes a thin wall section "a" (to become low strength section 15) joined between two long thick wall sections "b". In this example, the wall thickness t2 of the thin wall section "a" is equal to 2.0 mm whereas the wall thickness t1 of the thick wall sections "b" is equal to 2.6 mm. The width of the thin wall section "a" is set approximately equal to the width L1 of the first embodiment as measured in the vehicle longitudinal direction. These thick wall sections "b" and thin wall section "a" are joined together to a single flat plate or panel by welding.

Figure 11B:
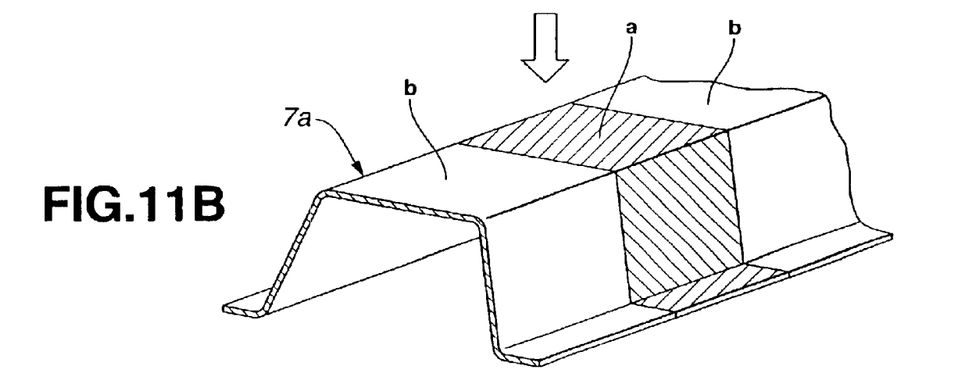

The thus-prepared flat plate as panel raw material as shown in FIG. 11A is press-formed by a press forming machine, into a shape having a trapezoidal cross section as shown in FIG. 11B (called a tailored blank manufacturing method). In this way, an upper panel 7a of side member 7 is produced.

Figure 11C:
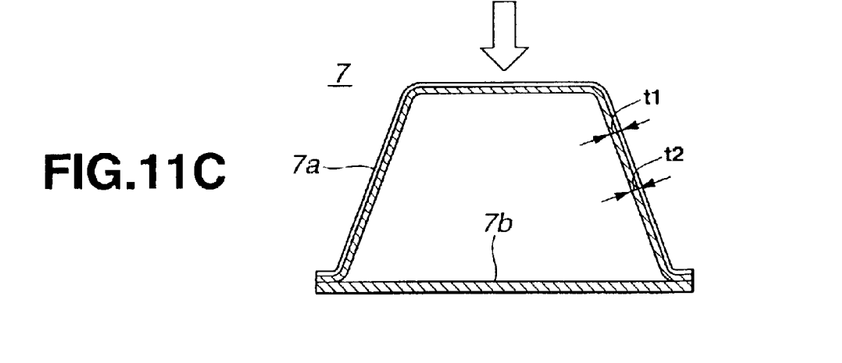

Then, side member 7 is produced by joining a lower panel 7b to form the under side of side member 7, to upper panel 7a by spot welding. Side member 6 is produced in the same manner by the tailored blank method. As shown in FIG. 11C, each side member 6 or 7 in this example is in the form of a box beam or box girder formed by joining two or more panels.

In case of a collision, first and second low strength portions 15a and 15b collapse together in an early stage. In this case, the lower side of each side member 6 or 7 formed by lower panel 7b is not readily deformed at the position just below low strength section 15. Therefore, each of side members 6 and 7 is bent to a V-shaped form having a front section sloping down to the position of low strength section 15 and a rear section sloping upwards from the position of low strength section 15. In this state, the front section of each side member 6 or 7 acts to apply impact energy to push the rear section of the side member in an oblique direction intermediate between the downward direction and the rearward direction toward the rear of the vehicle.

Therefore, in the middle and later stages of the collision, this front vehicle body structure can promote the downward bending deformation of each side member 6 or 7, and shift the engine (or power unit) E downwards in a reliable manner, as in the first embodiment.

The second embodiment can provide the following effects in addition to the effects of the first embodiment. The weak section 15 in each side member 6 or 7 having the reduced wall thickness causes V-shaped deformation of each side member at the early stage of a collision, and acts to prevent rearward movement of engine E in a collision. Side members 6 and 7 including weak sections 15 can be produced readily by joining upper panel 7a including thin wall section, and lower panel 7b.

Figure 12:
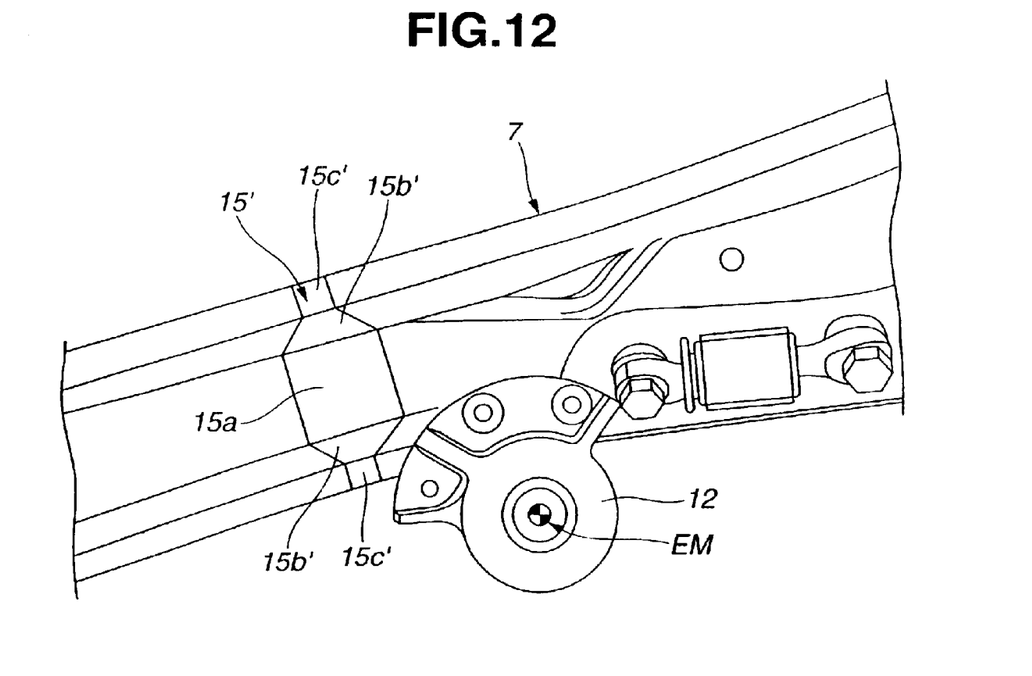
FIG. 12 is a plan view showing a low strength section in a left side member according to a third embodiment of the present invention.
Figures 13A, 13B:
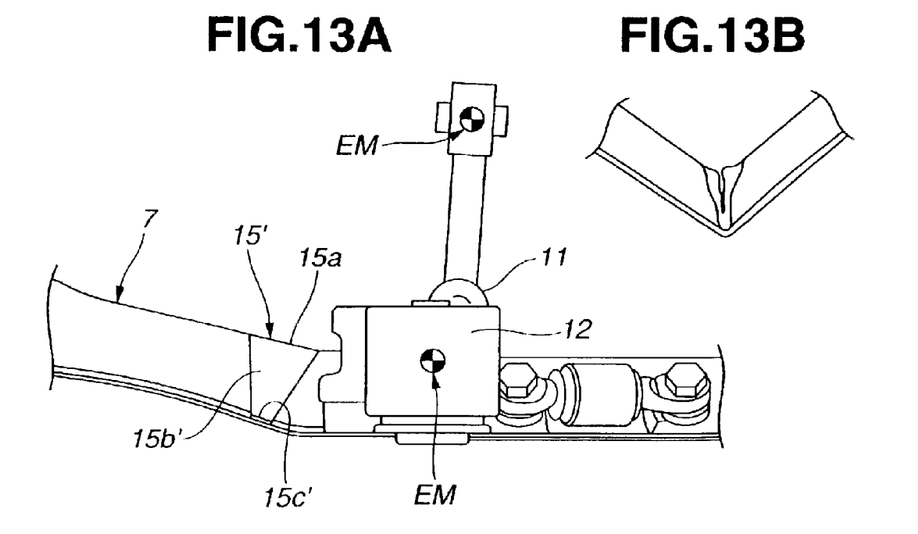
FIG. 13A is a side view showing the low strength section in the left side member of FIG. 12.
FIG. 13B is a view showing the low strength section of FIG. 13A in a deformed state.

FIGS. 12 and 13 (13A and 13B) show a front vehicle body structure according to a third embodiment. In the third embodiment, each side member 6 or 7 includes a low strength section (or weak section) 15' having a reduced wall thickness as in the second embodiment. Low strength section 15' includes a first (upper) low strength portion 15a formed in the upper side of the side member, second (lateral) low strength portions 15b' formed in the side walls of the side member, and lower panel joint portions 15c'. Second low strength portions 15b' extend downwards continuously, respectively, from the inboard and outboard ends of first low strength portion 15a, and lower panel joint portions 15c' extend sideways continuously, respectively, from second low strength portions 15b' on the inboard and outboard sides.

The strength or rigidity of first low strength portion 15a is lower than the strength of each of second low strength portions 15b'. As shown in FIG. 12, first low strength portion 15a is rectangular and has a relatively broad area of the thin-walled region. On the other hand, each of the thin-walled second low strength portions 15b' is tapered so that the longitudinal width as measured in the longitudinal direction of the side member or in the longitudinal direction of the vehicle is decreased gradually toward the lower end, as best shown in FIG. 13A in the form of a trapezoid having two parallel sides, with the shorter one being located on the lower side and the longer one being located on the upper side. In other respects, the construction of the third embodiment is substantially identical to that of the second embodiment, and the structure of the third embodiment is produced by the tailored blank manufacturing method as in the second embodiment.

In case of a collision, first and second low strength portions 15a and 15b' collapse together in an early stage. In this case, first low strength portion 15a having the wide area is bent largely by impact force of the collision whereas second low strength portions 15b' are so designed that the amount of deformation is decreased from the upper end toward the lower end. Therefore, low strength section 15' promotes a V-shaped bending of the side member 6 or 7. In the bent state, the front section of each side member 6 or 7 on the front side of low strength section 15' acts to apply impact energy to push the rear section of the side member on the rear side of low strength section 15' in the oblique direction intermediate between the downward direction and the rearward direction. Therefore, in the middle and later stages of the collision, this structure promotes downward bending of each side member 6 or 7, as shown in FIG. 13C, and functions to shift engine E (power unit) downwards.

The third embodiment can provide the following effects in addition to the effects of the first and second embodiments. The structure having first low strength portion 15a lowered in strength than second low strength portions 15b' can effectively promote downward bending deformation of the side member. Tapered second low strength portions 15b' in each side member 6 or 7 can effectively promote V-shaped deformation of each side member at the early stage of a collision, and acts to prevent rearward movement of engine E in a collision.

The weak section (14, 15, 15') in the embodiments of the present invention is a section in which the impact strength is lowered. The weak section may be a bead section in the form a groove formed in a panel, a low strength section having a portion whose wall thickness is reduced, or a portion made of a lower strength material, or a portion having both such a bead portion and such a low strength portion. The power unit is a prime mover of a vehicle, and may be a combination of an engine and a transmission in the case of a vehicle of a gasoline engine or a diesel engine, a combination of an engine, a motor and a transmission in the case of a hybrid vehicle, or a motor in the case of an electric vehicle or a fuel cell vehicle. A side member which can be employed in the present invention may be a member in a frame or subframe, or an independent member including both ends connected with vehicle body panels or a vehicle body frame.

Although the invention has been described above with reference to certain embodiments of the invention, the invention is not limited to the embodiments described above. Modifications and variations of the embodiments described above will occur to those skilled in the art in light of the above teachings. For example, the invention is applicable to vehicle body structures of various forms. The vehicle body structure of each illustrated embodiment is of a type forming a subframe. However, the weak section 14, 15 or 15' can be applied to side members of various other types of vehicle body structures. Low strength portions of the second and third embodiments are made from a panel having a smaller wall thickness. However, it is optional to use, as a material of the low strength portions, a material having a lower strength or rigidity lower than the strength or rigidity of a material for the surrounding portions. Moreover, it is possible to form the low strength portions by decreasing the wall thickness and at the same time using a material of lower strength as compared to the surrounding portions. Moreover, in addition to the first and second low strength portions weakened with at least one of the wall thickness and the choice of the material, it is optional to increase the strength of the lower portion of the lower panel just below the low strength portions by increasing the wall thickness or choosing a higher strength material partially. The weak section according to the invention may include a combination of a bead portion according to the first embodiment, and a low strength portion according to the second or third embodiment. One of the portions 11 and 12 corresponds to means for supporting the power unit of a vehicle at a support point between front and rear ends of the side member. Any one or more of the portions 14, 15, 15', 16 and 17 correspond to means for controlling the bending deformation of the side member in case of an impact force being applied from the front end of the side member in the longitudinal direction in a collision of the vehicle, and for causing the support point to move downward by the bending deformation of the side member.

This application is based on a prior Japanese Patent Application No. 2001-353713 filed in Japan on Nov. 19, 2001, a prior Japanese Patent Application No. 2002-058638 filed in Japan on Mar. 5, 2002, and a prior Japanese Patent Application No. 2002-260934, filed in Japan on Sep. 6, 2002. The entire contents of these prior Japanese Patent Applications are hereby incorporated by reference.

The scope of the invention is defined with reference to the following claims.

What is claimed is:

1. A vehicle front structure comprising:

a side member to be placed to extend in a longitudinal direction of a vehicle, the side member including a support portion to support a power unit at a support point, and a weak section which is formed in front of the support point, and which is weakened in an upper side and lateral sides of the side member with respect to a lower side of the side member, wherein the weak section includes an upper portion extending in the upper side of the side member in a widthwise direction of the side member, and lateral portions extending downwards, respectively, from both ends of the upper portion toward a lower portion in the lower side of the side member, and the upper and lateral portions are weakened as compared to the lower portion, wherein the side member extends from a front end to a rear end in the longitudinal direction of the vehicle toward the rear of the vehicle in an assembled state in which the vehicle front structure is a part of the vehicle, and the weak section is located between the front end of the side member and the support point, near the support point, wherein the side member is in the form of a box beam of panels joined together; the side member includes a front section extending from the weak section toward the front end of the side member, and a rear section extending from the weak section toward the rear end of the side member; and the upper and lateral portions of the weak section are differentiated in one of shape and material, to lower the strength, from the front and rear sections of the side member and the lower portion of the weak section, and wherein each of the upper portion and the lateral portions of the weak section of the side member is a bead portion which is a depressed panel portion depressed inwards, and the lower portion of the weak section is a bulged panel portion bulged outwards.

2. A vehicle front structure comprising:

a side member to be placed to extend in a longitudinal direction of a vehicle, the side member including a support portion to support a power unit at a support point, and a weak section which is formed in front of the support point, and which is weakened in an upper side and lateral sides of the side member with respect to a lower side of the side member, wherein the weak section includes an upper portion extending in the upper side of the side member in a widthwise direction of the side member, and lateral portions extending downwards, respectively, from both ends of the upper portion toward a lower portion in the lower side of the side member, and the upper and lateral portions are weakened as compared to the lower portion, wherein the side member extends from a front end to a rear end in the longitudinal direction of the vehicle toward the rear of the vehicle in an assembled state in which the vehicle front structure is a part of the vehicle, and the weak section is located between the front end of the side member and the support point, near the support point, and wherein each of the lateral portions is shorter at least in part in a width as measured in a longitudinal direction of the side member than the upper portion.

3. The vehicle front structure as claimed in claim 2, wherein the upper portion is an upper bead portion and the lateral portions are lateral bead portions, and the width of the upper bead portion is longer than the width of each lateral portion as measured in the longitudinal direction of the side member.

4. The vehicle front structure as claimed in claim 2, wherein the strength of the upper portion is lower than the strength of each of the lateral portions.

5. A vehicle front structure comprising:

a side member to be placed to extend in a longitudinal direction of a vehicle, the side member including a support portion to support a power unit at a support point, and a weak section which is formed in front of the support point, and which is weakened in an upper side and lateral sides of the side member with respect to a lower side of the side member, wherein the weak section includes an upper portion extending in the upper side of the side member in a widthwise direction of the side member, and lateral portions extending downwards, respectively from both ends of the upper portion toward a lower portion in the lower side of the side member, and the upper and lateral portions are weakened as compared to the lower portion, and wherein the lower portion of the side member is in the form of a bent portion projecting downwards at a position just below the upper portion of the weak section.

6. The vehicle front structure as claimed in claim 5, wherein the vehicle front structure comprises two of the side members each including a support portion and a weak section, a front cross member connecting the front ends of the side members, and a rear cross member connecting the rear ends of the side members.

7. A vehicle front structure comprising:

a side member to be placed to extend in a longitudinal direction of a vehicle, the side member including a support portion to support a power unit at a support point, and a weak section which is formed in front of the support point, and which is weakened in an upper side and lateral sides of the side member with respect to a lower side of the side member, wherein the side member includes a lower bead portion formed in the lower side of the side member at a position between the front end of the side member and the position of the weak section, behind a vehicle mount point defined by the front end of the side member.

8. The vehicle front structure as claimed in claim 7, wherein the side member includes a bent portion projecting upwards from the upper side of the side member, at a position just above the third bead portion.

* * * * *